(12) United States Patent
Page et al.

(10) Patent No.: US 6,568,821 B1
(45) Date of Patent: May 27, 2003

(54) EDGE-LIT ILLUMINATION SYSTEM

(75) Inventors: John Mark Page, London (GB); John Henry Forster, Cleveland (GB)

(73) Assignee: Lucite International UK Limited, Southhampton (GB)

(*) Notice: Subject to any disclaimer, the term of this patent is extended or adjusted under 35 U.S.C. 154(b) by 0 days.

(21) Appl. No.: 09/647,448

(22) PCT Filed: Mar. 25, 1999

(86) PCT No.: PCT/GB99/00949
§ 371 (c)(1),
(2), (4) Date: Dec. 21, 2000

(87) PCT Pub. No.: WO99/51913
PCT Pub. Date: Oct. 14, 1999

(30) Foreign Application Priority Data

Apr. 4, 1998 (GB) ............................................. 9807204

(51) Int. Cl.[7] ................................................. F21V 8/00
(52) U.S. Cl. ......................................................... 362/31
(58) Field of Search .............................. 362/31; 385/146

(56) References Cited

U.S. PATENT DOCUMENTS 5,617,251 A * 4/1997 Ohta et al. ................. 362/31 X
5,839,812 A * 11/1998 Ge et al. ....................... 362/31
5,926,033 A * 7/1999 Saigo et al. ................ 362/31 X
6,118,503 A * 9/2000 Oki et al. ................... 362/31 X

FOREIGN PATENT DOCUMENTS

| CN | 245010 | 4/1995 |
| EP | 0719981 | 7/1996 |
| WO | 92 05535 | 4/1992 |

* cited by examiner

Primary Examiner—Laura K. Tso
(74) Attorney, Agent, or Firm—Pillsbury Winthrop LLP

(57) ABSTRACT

An edge-lit illumination system comprising a light transmitting sheet (10) which has a surface treatment, capable of reflecting or scattering light, on at least one of its opposing surfaces (11, 12), a light source (13) positioned in proximity to, and adjacent to, an edge of this sheet, and a reflective surface (14) positioned adjacent to an edge of the sheet, at an obtuse angle (18) to the plane of the sheet and extending away from one surface of the sheet. The reflective surface is preferably disposed adjacent to the edge of the light transmitting sheet having the light source adjacent to it. The obtuse angle preferably ranges from 100 to 145 degrees. This invention gives an increase in the area of illumination across the light transmitting sheet.

13 Claims, 4 Drawing Sheets

EDGE-LIT ILLUMINATION SYSTEM

The present invention relates to an edge-lit illumination system.

Edge-lit illumination systems which have as a basic feature a light source positioned alongside an edge of a light transmitting sheet are well known. The light transmitting sheet may be treated on its surface so that the light entering the edge of this sheet is irregularly reflected or scattered. Therefore the sheet transmits more light than would be expected from the intensity of the light source. EP-A-0549679 discloses such an edge-lit illumination system where the light transmitting sheet is an acrylic resin having a matrix of dots applied to both its surfaces. U.S. Pat. No. 5,178,447 discloses an edge-lit light transmitting sheet with an irregular mesh pattern formed on one of its surfaces comprising dots of light reflecting material.

Many types of light source are available: for example fluorescent tubes are used in a variety of edge-lit illumination applications. The area of illumination is limited by the size of the light transmitting sheet, the intensity of the light source and the ability of the light source to effectively illuminate the area required.

In some application areas, for example signs, it is preferable that the light is distributed evenly across the sheet. One way of obtaining an evenness of illumination deemed suitable for illumination systems that has been widely reported is to increase the density of the surface treatment in a direction away from the edge of the light transmitting sheet at which the light source is positioned. This may be achieved by increasing the size of, for example, the dots themselves and/or the number of dots per unit area as disclosed in EP-A-0549679.

In the above embodiment the evenness may not be complete. There may be an area on the surface of the light transmitting sheet adjacent to the light source which may extend along the whole edge of the sheet adjacent to the light source which is slightly brighter than the rest of the sheet. This is commonly referred to as a "hot spot". Such edge-lit illumination systems are often used to illuminate a graphics sheet adjacent to a surface of the light transmitting sheet. This system may be surrounded by a supporting frame of which the dimensions should be sufficient to house the light source and associated electrical and controlling equipment. The width of the supporting frame may be chosen such that it not only houses the light source and related equipment but also extends over the light transmitting sheet to cover the "hot spot". This is a disadvantage as there is a reduction in the area of illumination of the light transmitting sheet available for the graphics.

It is an object of the present invention to provide such an edge-lit illumination system with an enhancement in the overall area of the illumination system.

Accordingly the present invention provides an edge-lit illumination system comprising a light transmitting sheet, said light transmitting sheet having a surface treatment capable of reflecting or scattering light, on at least one of its opposing surfaces; a light source positioned in proximity to, and adjacent to, an edge of said sheet, and a reflective surface disposed adjacent to an edge of the sheet, at an obtuse angle to the plane of said sheet and extending away from one surface of said sheet.

This invention gives an increase in the area of illumination across the light transmitting sheet. Also there is a reduction in the level of brightness of the "hot spot".

For convenience we will refer to the surface of the light transmitting sheet from which the reflective surface extends as the upper surface although it is appreciated that the light transmitting sheet may be used in any spatial configuration.

The light transmitting sheet comprises a transparent material. It may be glass or plastic but is preferably plastic and more specifically a clear acrylic sheet. The thickness of the light transmitting sheet may vary from typically 1 to 25 mm. The surface of at least one side of this sheet is treated so that it has the additional capability to reflect or scatter the light. Both opposing surfaces may be so treated. This surface effect may be achieved in a variety of ways; for example by roughening the surface as disclosed in U.S. Pat. No. 4,385,343 wherein the roughening was a myriad of facets randomly disposed, or by application of a matrix of light reflecting material either directly to the surface of the light transmitting sheet or to a transparent film which is then adhered to the light transmitting sheet as disclosed in EP-A-0549679. Application of a matrix of light reflecting material is preferred. Preferably this light reflecting material takes the form of dots which may be etched, painted or screen printed directly on to the surface or that of the transparent film. The dots may be of any shape, for example square, round, rectangular, triangular or irregular. They can be translucent or opaque and are preferably light coloured. By translucent we mean capable of transmitting rays of light with diffusion also. By opaque we mean substantially incapable of transmitting light. The density of dots are preferably increased in a direction away from the edge of the light transmitting sheet at which the light source is positioned. The density of dots can be increased by increasing the size of the dots and/or the number of dots per unit area.

Many types of light source are available but preferably fluorescent tubing is used. The diameter of the fluorescent tube may vary from typically 6 mm, commonly referred to as T2, to 25 mm, T8. Preferably the diameter of the fluorescent tube is at least equal to the thickness of the light transmitting sheet. The distance from the edge of the light transmitting panel to the crest of the tube is preferably between 1 and 2 mm. Preferably the light transmitting sheet is in a fixed relationship to the light source.

In this invention by reflective surface we mean a surface that has the capability to reflect light but may also be of such a material as to be able to transmit light. The reflective surface is positioned such that it reflects light which is emitted from a surface of the light transmitting sheet. Preferably the reflective surface is positioned such that it reflects light which is emitted from the surface of the light transmitting sheet which is treated. The reflective surface is disposed adjacent to an edge of the sheet and is preferably disposed adjacent to the edge having the light source in proximity thereto. More preferably the reflective surface is disposed adjacent to this edge and extends away from the upper surface of the light transmitting sheet which is treated.

The reflective surface may be the upper surface of a relatively thin layer of material capable of reflecting light, e.g. a metallised or white plastic sheet or a metal sheet. Where the edge-lit illumination system is surrounded by a supporting frame the reflective surface may be joined to the supporting frame itself. Alternatively the reflective surface may be supported upon a support structure which may comprise a block or wedge, framework or like structure and hence form the upper surface of the support structure. The reflective surface extends away from the upper surface of the light transmitting sheet at an obtuse angle preferably between 100 and 145 degrees. The reflective surface is preferably light coloured, more preferably white and preferably it extends along the whole edge of the light transmitting sheet. The reflective surface may be flat or curved.

The width of the reflective surface and its support structure may range from 5 mm to 150 mm.

A graphics sheet may be positioned above the upper surface of the light transmitting sheet from which the reflective surface extends. This graphics sheet may extend to substantially cover the whole area embraced by the light transmitting sheet and its associated reflective surface and so can cover an area greater than that of the light transmitting sheet. Therefore there is an increase in the area of illumination to one greater than the actual area of the light transmitting sheet.

If the light source is a fluorescent tube of a diameter less or equal to the thickness of the light transmitting sheet and the reflective surface is the upper surface of a relatively thin layer of material then the graphics sheet, or preferably a diffuser with a graphics sheet above it, may be positioned substantially in contact with the upper surface of the light transmitting sheet. As in the above embodiment there is an increase in the area of illumination to one greater than the actual area of the light transmitting sheet.

The diffuser may be translucent or transparent and may be glass or plastic material. Preferably the diffuser must be capable of transmitting light with some diffusion capabilities also. For example the diffuser may be a 3 mm thickness cast acrylic opal 040 sheet (available ex Imperial Chemical Industries PLC) which has a light transmittance value of 46% or a 3 mm thickness 000 clear silk cast acrylic sheet (available ex Imperial Chemical Industries PLC) having a light transmittance of 79%.

For one sided illuminated signs for the two examples of type of reflective surface described above a reflective backing material may be positioned in contact with substantially all of the opposite surface of the light transmitting sheet to the upper surface. The reflective backing material may be paper, metal or plastic but is preferably metal or plastic. For example it may be gloss white coated aluminium, or a plastics material such as polystyrene or acrylic.

For two sided illuminated signs instead of the use of a reflective backing material as described above a second reflective surface may be disposed adjacent to the opposite surface of the light transmitting sheet to the upper surface and extending at an obtuse angle away from this opposite side of said sheet. A second graphics sheet, or preferably a diffuser with a graphics sheet above it, may be positioned underneath this opposite surface of the light transmitting sheet.

In a further embodiment of a two sided sign a reflective backing material may be positioned in contact with substantially all of the opposite surface of the light transmitting sheet and a further light transmitting sheet may be positioned in contact with the opposing surface of the reflective backing material.

In further embodiments the addition to the above examples of the present invention of further light transmitting sheets and further light sources may introduce the benefit of flexibility in the choice of area and shape for edge-lit illumination systems. For example a further light transmitting sheet may be positioned adjacent to the opposite side of the light source to the light transmitting sheet. Within this embodiment a second reflective surface may be disposed adjacent to the further light transmitting sheet at an obtuse angle to the plane of the further light transmitting sheet and extending away from the surface of said further light transmitting sheet. In this way a substantially continuous area can be illuminated embracing both light transmitting sheets. Preferably a single continuous graphics sheet may be placed spaced above the combination of the light transmitting sheets. Therefore for a single light source the overall area of illumination is significantly increased.

Extending this concept, a further light source and a further reflective surface, may be positioned alongside another edge of either light transmitting sheet. This allows for the introduction of further light transmitting sheets adjacent to the opposing edges of the light sources to the original light transmitting sheets. This expansion can continue.

The light transmitting sheets of these embodiments may be at any angle to each other but are preferably co-planar.

In all of the above embodiments each light transmitting sheet may have a separate reflective backing material or a single reflective backing material may be common to all the light transmitting sheets.

The edge-lit illumination system may be surrounded by a supporting frame with at least one viewing window. The frame should be of sufficient width to house the light source, electrical and controlling equipment, if present within the frame.

Six specific embodiments of the invention will now be further described as examples only with reference to the accompanying drawings, FIGS. 1 to 6, which represent a section through an illuminated display system according to the invention. These drawings are not to scale but are for illustration purposes only.

In FIG. 1 the reflective surface (14) is supported on a support structure (15) and the graphics (16) are spaced apart from the light transmitting sheet (10). The light transmitting sheet has an upper (11) and opposing surface (12). The light source (13) is positioned adjacent to the edge of the light transmitting sheet from which the reflective surface extends. The reflective surface extends away from the upper surface of the light transmitting sheet at an obtuse angle (18). A reflective backing material (17) is positioned substantially in contact with the opposing surface of the light transmitting sheet.

In FIG. 2 the reflective surface (19) is the upper surface of a relatively thin layer of plastic sheet. A diffuser (20) is positioned substantially in contact with the upper surface of the light transmitting sheet adjacent to the reflective surface and a reflective backing material is positioned substantially in contact with the opposing surface of the light transmitting sheet.

In FIG. 3 the reflective backing material of FIG. 1 is replaced by a second reflective surface (22) adjacent to the opposing surface of the light transmitting sheet and further graphics (21) are spaced apart from this surface.

FIG. 4 is as described in FIG. 1 with the addition of a further light transmitting sheet (23) and a further reflective surface (24) which is supported on a support structure (25) positioned adjacent to the opposing side of the light source to the light transmitting sheet. A single continuous graphics sheet (26) is spaced above both light transmitting sheets. Individual reflective backing materials (27, 17) are positioned substantially in contact with the opposing surface of each individual light transmitting sheet (23, 10).

FIG. 5 is as described in FIG. 2 with the addition of a further light transmitting sheet (28) and a further reflective surface (29) which is the upper surface of a relatively thin layer of plastic sheet positioned adjacent to the opposing side of the light source to the light transmitting sheet. A single continuous diffuser (30) is positioned substantially in contact with both light transmitting sheets. A single continuous graphics sheet (31) is positioned substantially in contact with the diffuser.

FIG. 6 is as described in FIG. 1 with the addition of a further light transmitting sheet (32) positioned on the opposing surface of the reflective backing material (17). A further reflective surface on a support (33) is positioned adjacent to the opposing surface (34) of the light transmitting sheet. A further graphics sheet (35) is positioned spaced apart from this opposing surface of the light transmitting sheet.

EXAMPLE 1

Figure 1:
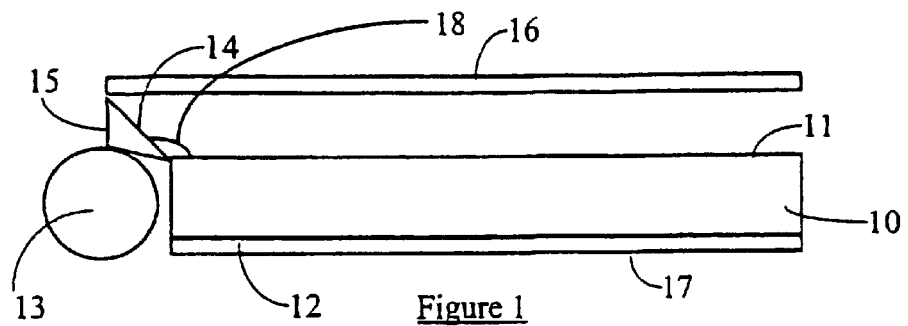
Figure 2:
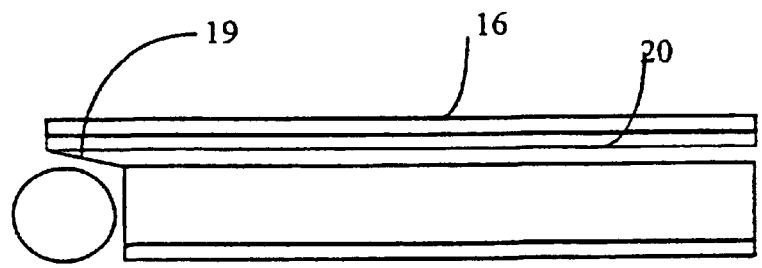
Figure 3:
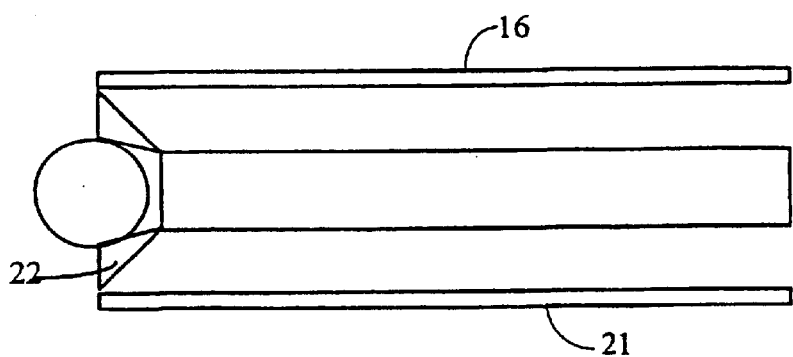
Figure 4:
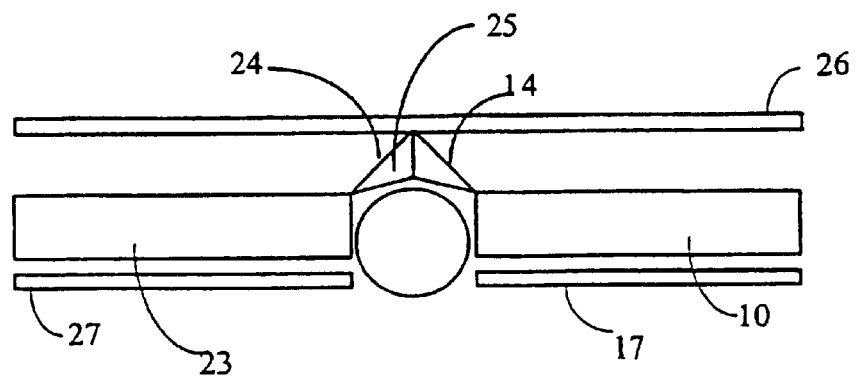
Figure 5:
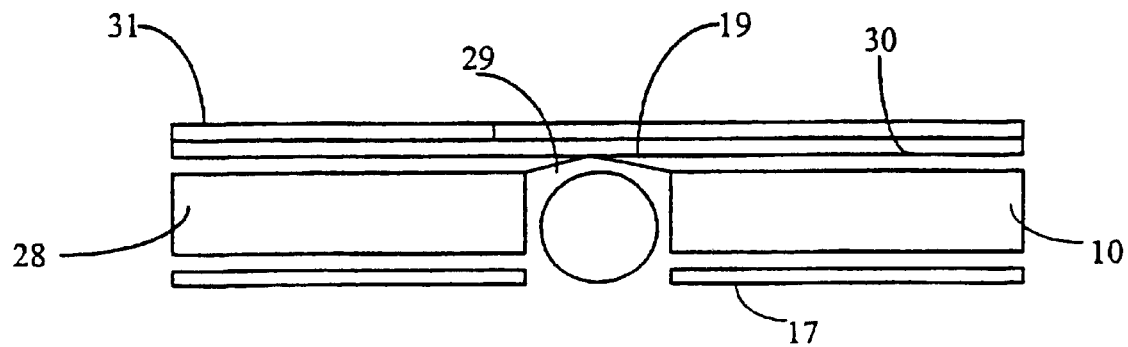
Figure 6:
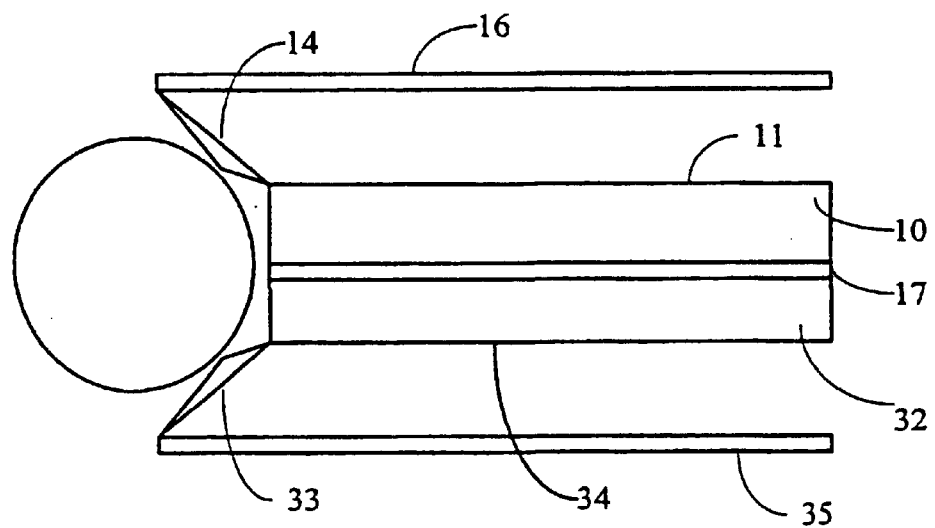
Figure 7:
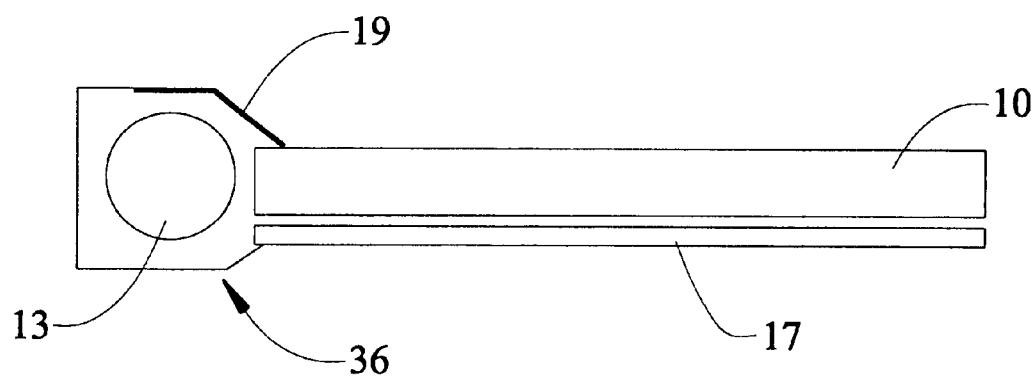
FIG. 7 is as described in FIG. 1 with the addition of a supporting frame (36) surrounding the light source (13) adjacent to the light transmitting sheet (10), and the supporting frame also has a reflective surface (19) as described in FIG. 2.
Figure 8:
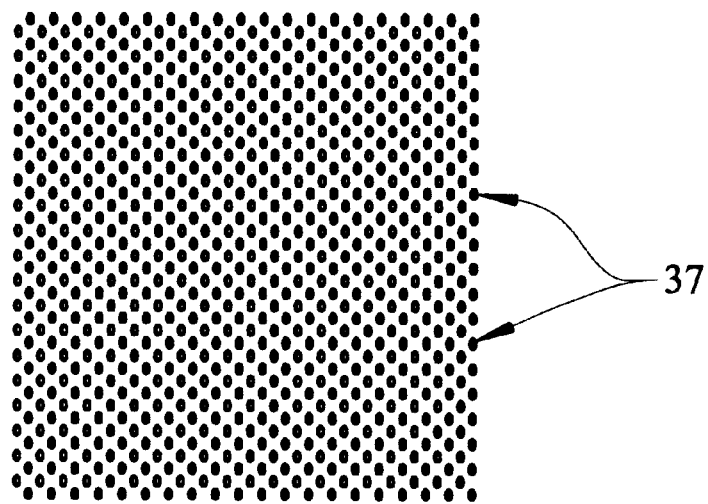
FIG. 8 is a depiction of the embodiment of the surface treatment of the light transmitting sheets comprising a matrix of dots (37) which may be etched, painted or screen-printed.
Figure 9:
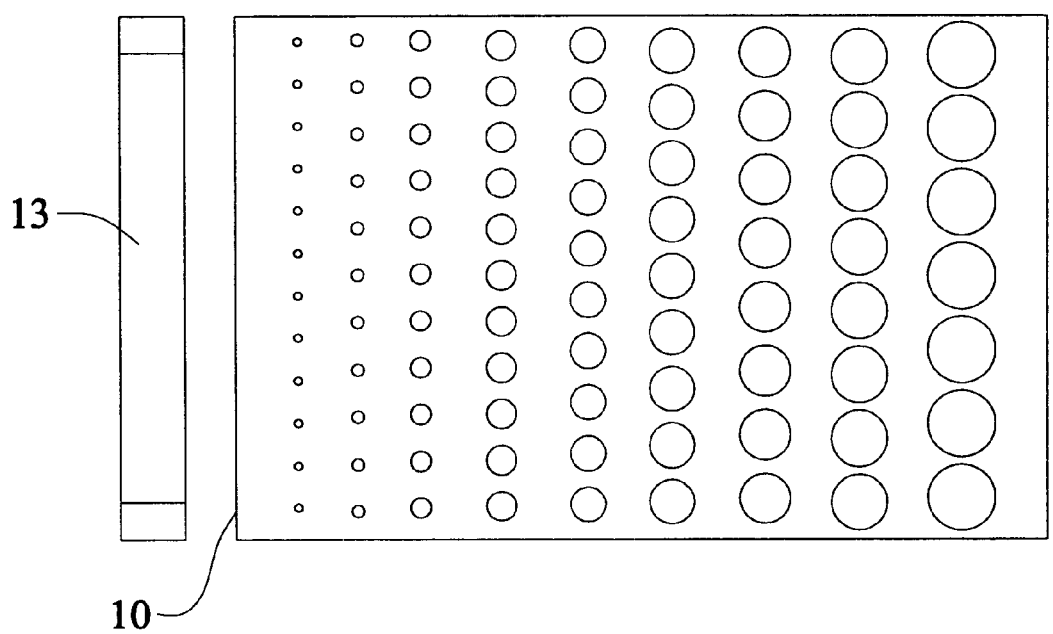
FIG. 9 is a depiction of one embodiment of the matrix of dots of FIG. 8. In this embodiment, the density of dots is increased in a direction away from the edge of the light illuminating sheet (10) at which the light source (13) is positioned.

For the invention as shown in FIG. 1 the light transmitting sheet (10) is a rectangular sheet of 420 mm width by 610 mm length and 10 mm thickness of clear cast polymethylmethacrylate which has been treated by screen printing white dots directly on to both its opposing surfaces (11,12). The light source is a Sylvania Luxline Plus Daylight Delux fluorescent tube (13) which has a power output of 18 Watts, a colour rendering value (Ra) of 86, a colour temperature of 6500 Kelvin and a diameter of 25 mm. The tube is positioned adjacent to one of the longer edges of the light transmitting sheet and a reflective surface (14) is positioned on a support (15) adjacent to that edge extending away form the upper surface of the light transmitting sheet at an angle of 135°(18). The reflective backing material (17) is gloss white sprayed aluminium. A graphics sheet (16) is positioned spaced apart from the surface of the light transmitting sheet covering the whole area embraced by the light transmitting sheet and its associated reflective surface.

Therefore there is an increase in the area of illumination as compared to the area of the light transmitting sheet. Also it is found that there is no evidence to the naked eye of a "hot spot" on the light transmitting sheet at the edge adjacent to the fluorescent tube. The graphics sheet appears to be evenly illuminated.

What is claimed is:

1. An edge-lit illumination system comprising a light transmitting sheet, said light transmitting sheet having a surface treatment capable of either reflecting or scattering light, on at least one of its opposing surfaces; a light source positioned in proximity to, and adjacent to, an edge of said sheet, and a reflective surface positioned adjacent to an edge of the sheet, at an obtuse angle to the plane of said sheet and extending away from one surface of said sheet.

2. An edge-lit illumination system as claimed in claim 1 wherein the reflective surface is disposed adjacent to the edge of the light transmitting sheet having the light source in proximity thereto.

3. An edge-lit illumination system as claimed in claim 1 wherein the reflective surface is the upper surface of a thin layer of material capable of reflecting light.

4. An edge-lit illumination system as claimed in claim 3 wherein the thin layer of material is joined to a supporting frame which surrounds said illumination system.

5. An edge-lit illumination system as claimed in claim 1 wherein the reflective surface is the upper surface of a support structure.

6. An edge-lit illumination system as claimed in claim 1, wherein the reflective surface extends away from the treated surface of the light transmitting sheet at an obtuse angle between 100 and 145 degrees.

7. An edge-lit illumination system as claimed in claim 1, wherein the reflective surface extends along the whole of said edge of the light transmitting sheet.

8. An edge-lit illumination system as claimed in claim 5 wherein a graphics sheet is positioned above the upper surface of the light transmitting sheet from which the reflective surface extends.

9. An edge-lit illumination system as claimed in claim 1 wherein a graphics sheet is positioned substantially in contact with the upper surface of the light transmitting sheet.

10. An edge-lit illumination system as claimed in claim 1 wherein a further light transmitting sheet is positioned adjacent to the opposite side of the light source to the light transmitting sheet and a further reflective surface is positioned adjacent to an edge of the further sheet, at an obtuse angle to the plane of said sheet and extending away from one surface of said sheet.

11. An edge-lit illumination system as claimed in claim 1, wherein the further reflective surface is disposed adjacent to the edge of the further light transmitting sheet having the light source in proximity thereto.

12. An edge-lit illumination system as claimed in claim 1 wherein the surface treatment is a matrix of etched, painted or screen printed dots.

13. An edge-lit illumination system as claimed in claim 12 wherein the density of dots within the matrix is increased in a direction away from the edge of each light transmitting sheet at which the light source is positioned.

* * * * *